United States Patent Office 3,316,896
Patented May 2, 1967

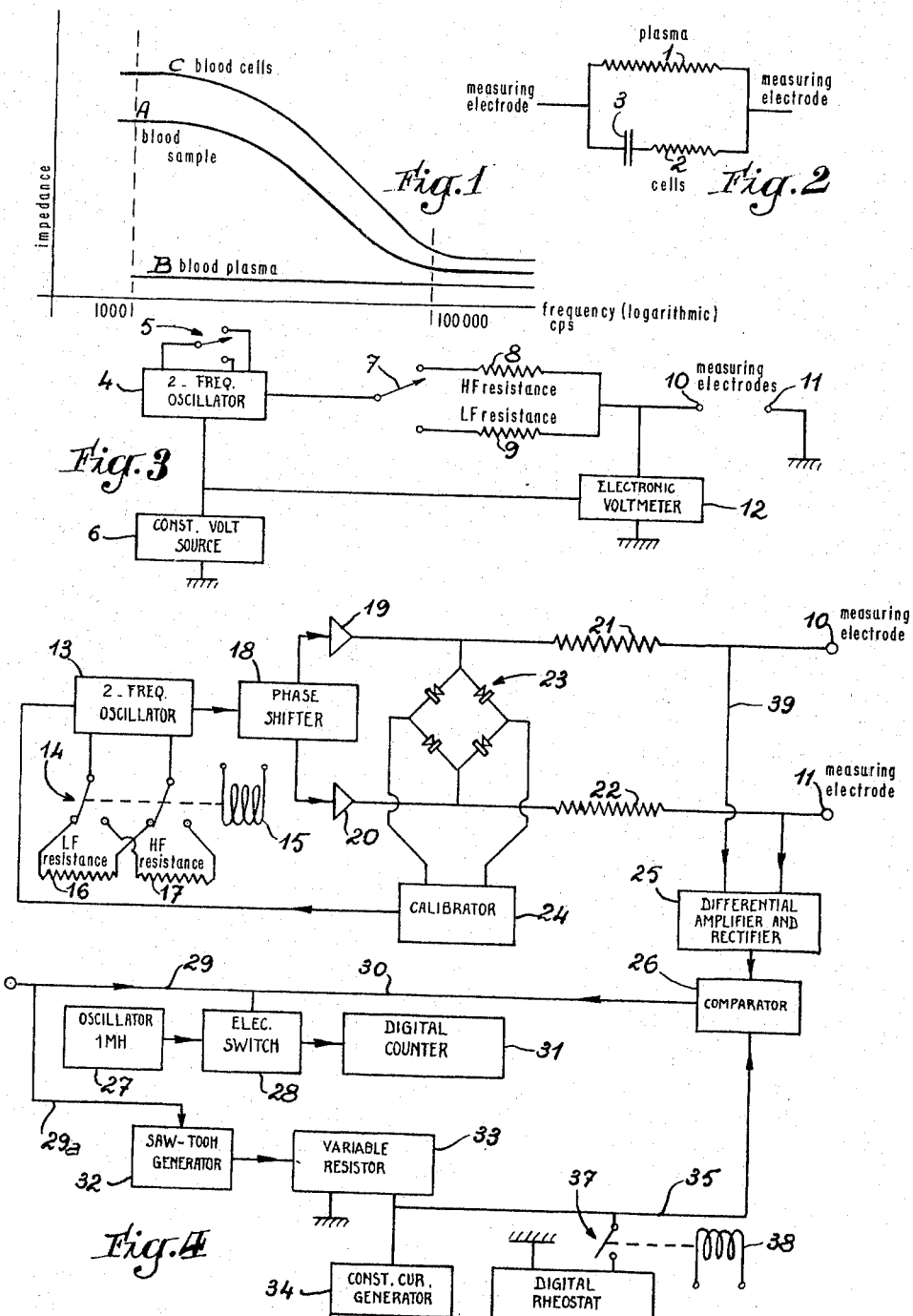

3,316,896
APPARATUS AND METHODS FOR THE MEASURE OF THE ELECTRICAL IMPEDANCE OF LIVING ORGANISMS
Auguste Louis Thomasset, 11 Rue Emile Zola, Lyon, France
Filed Oct. 15, 1963, Ser. No. 316,214
Claims priority, application France, Oct. 18, 1962, 42,968, Patent 1,344,459
7 Claims. (Cl. 128—2.1)

The present invention relates to measuring the electric impedance of a living organism such as the human body.

It is known that the ohmic resistance of the human body is influenced by various pathological conditions and that it may therefore form an important diagnostic element. But the measuring operation should be effected under determined and invariable conditions, as for instance between the right hand and the left hand, and while eliminating as far as possible the influence of spurious factors capable of causing false indications. It has been proposed in this respect to use measuring electrodes disposed under the skin in order to eliminate the conductivity of the latter which varies widely under the effect of moisture. The influence of electrolytic phenomena may also be avoided by operating with alternating current at a sufficient frequency instead of direct current, but in such a case the magnitude measured is an impedance rather than an ohmic resistance and it has been observed that its value varies considerably with the A.C. frequency. It is therefore necessary to operate at a constant predetermined frequency.

An object of the present invention is to provide a method and means to obtain a value of such an impedance which may form a much more reliable diagnostic element than hitherto.

The present invention is based on the following considerations. The medium through which the electric current flows between the electrodes may be considered as comprising a liquid, more particularly blood plasma, and cells, including blood globules. These two kinds of constituents have widely different impedances, as this may be demonstrated by measuring (at a fixed frequency) the impedance of a sample of blood proper and then the elementary impedances of the cells and of the plasma which form the blood. It is then observed that at moderate frequencies, say 1000 cycles as hitherto used, the impedance of the plasma is much lower than the impedance of the cells. It is clear therefore that the measuring operations as hitherto effected can only give a mean value resulting from the elementary impedances of the plasma and of the cells or globules, and that a much more accurate diagnosis would be obtained if these elementary impedances were measured separately.

Furthermore, if the impedances of blood plasma and of blood globules are measured separately under increasing A.C. frequencies, it is observed that the value of the impedance of plasma remains substantially constant while on the contrary the value of the impedance of the globules decreases in a considerable manner until it becomes substantially equal to that of plasma at frequencies of the order of 100 kilocycles. It may be admitted that this decrease is due to the fact that at such high frequencies the globules behave like small capacitors and thus permit passage of a substantial capacitive current which is only limited by their internal ohmic resistance, i.e. by the resistance of the intra-cellular liquids. Therefore the value of the impedance at frequencies above 100 kilocycles of blood globules, or more generally of cells which have been separated from their associated liquids, may be considered as an information concerning the intracellular contents and as such it may form a much more valuable and reliable diagnosis than the impedance value of the globules or cells at lower frequencies.

Unfortunately, while these separate measures may be effected on a blood sample, it is quite impossible to separate the liquids from the cells in a living body.

In accordance with the present invention in order to determine the individual impedances of the intracellular contents and of the extracellular contents in a living organism, and more particularly in a human body, the total impedance of this organism is measured at a first or lower frequency which is just sufficient to eliminate electrolytic phenomena, say at about 1000 cycles, and at a second or higher frequency which is high enough to eliminate the capacitive impedance resulting from the membranes of the cells, say at 100 to 500 kilocycles, and the individual impedances are calculated by assuming that at the lower frequency the impedance due to the membranes of the cells is so high that the current which circulates through the said cells may be neglected. Under such conditions the impedance $Z_1$ measured at the lower frequency may be considered as the individual impedance $r_1$ of the liquids which surround the cells in the living organism (extracellular contents), while the impedance $Z_2$ measured at the higher frequency is the resultant of the aforesaid individual impedance $r_1$ and of the individual impedance $r_2$ of the internal contents of the cells (intracellular contents). Since at the higher frequency the capacitive impedance is quite small, $r_1$ and $r_2$ may be considered as substantially ohmic and therefore $r_2$ may be directly deduced from the conventional relation:

$$\frac{1}{Z_2} = \frac{1}{Z_1} + \frac{1}{r_2}$$

The invention further concerns a device or apparatus for the carrying into practice of the above method, this apparatus comprising an oscillator operating at two frequencies, and means to measure the current which passes through the subject at each frequency. In a particular embodiment the apparatus according to this invention comprises means to directly indicate the intracellular impedance $r_2$ by inserting the impedance $r_1$ or its analog in parallel with a variable compensating resistance which is compared with impedance $Z_2$ of the subject at the higher frequency.

In the annexed drawings:

FIG. 1 is a graph indicating the impedance/frequency curves of a blood sample, of the plasma and of the globules separated therefrom.

FIG. 2 shows an electric circuit which may be considered as the analog of blood from an electrical point of view.

Figure 5:
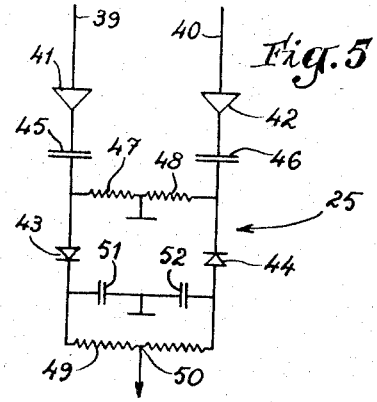

FIG. 3 diagrammatically illustrates a first embodiment of an apparatus for the carrying into practice of the invention.

FIG. 4 diagrammatically shows a second or preferred embodiment of such an apparatus.

FIGS. 5 to 9 illustrate under more detailed form some of the elementary devices of the apparatus according to FIG. 4, namely the differential amplifier and rectifier, the comparator, the electronic switch, the variable resistor and the constant current generator.

Referring to FIG. 1, if the impedance of a blood sample is measured in a glass tube at increasing frequencies, the impedance/frequency curve appears as indicated at A in FIG. 1, wherein the ordinates, which correspond to the value of the impedance, and the abscissae corresponding to the frequencies may be considered as logarithmic. Curve A comprises a substantially horizontal portion at the lower frequencies, then a descending portion the slope of which increases and thereafter decreases until the curve is again substantially horizontal above about 100 kilocycles. Curves B and C indicate under the same conditions the impedance of the plasma extracted from the same sample of blood and of the cells or globules thereof. Curve B (plasma) is substantially horizontal, at least above 1000 cycles and it is situated well below curve A up to about 100 kilocycles. Curve C (globules with a practically negligible amount of residual plasma) is considerably above curve A at the lower frequencies, but it sinks more rapidly. Above a frequency of about 100 kilocycles the three curves run horizontally, relatively close to each other.

The configuration of these three curves is easily explainable if it is assumed that the globules behave as minute capacitors (due to their outer membranes which are practically insulating as compared with the liquids) in series with minute resistors (formed by the intracellular contents). With this assumption the blood may be considered from an electrical point of view as comprising a first resistance 1 (FIG. 2) inserted between the measuring electrodes and corresponding to the plasma, and a resistance 2 in series with a capacitor 3 of small value also inserted between the electrodes in parallel with resistance 1. Resistance 2 corresponds to the intracellular contents and capacitor 3 to the membranes of the globules. At the lower frequency the impedance of capacitor 3 is considerable and therefore the intensity of the current passing through the sample is practically only dependent on resistance 1. On the other hand at the higher frequency the impedance of capacitor 3 is quite negligible and the intensity is governed by resistances 1 and 2 in parallel. More generally if $Z_1$ and $Z_2$ are the impedance values measured at the lower frequency $f_1$ and at the higher frequency $f_2$, taking into account that these impedances are substantially ohmic, their relations with the actual values $r_1$ and $r_2$ of resistances 1 and 2 are substantially as follows:

$$Z_1 = r_1$$

$$\frac{1}{Z_2} = \frac{1}{r_1} + \frac{1}{r_2}$$

The values of $r_1$ and $r_2$ are easily calculated from these relations:

$$r_1 = Z_1 \tag{1}$$

$$r_2 = \frac{Z_1 Z_2}{Z_1 - Z_2} \tag{2}$$

Of course these values of resistance (or impedance) are not "specific," i.e. they do not correspond to an impedance or resistance per unit of cross-sectional area and per unit of length, since if the length of the glass-tube containing the sample of blood is known, the respective areas occupied in a transverse section thereof by the plasma and by the globules are unknown. The values of $r_1$ and $r_2$ are therefore only indicative of the respective impedances or resistances as they appear in the glass tube, but of course they are quite reliable for a comparison between two blood samples tested in the same tube and under the same conditions.

The same considerations may be applied to any assembly of liquid and of cells, and more particularly to a living organism such as a human body. The measuring electrodes may be disposed in the known manner under the skin of the right and left hands of the subject and the impedance is measured at the frequencies $f_1$ and $f_2$ (as for instance 1000 cycles and 100 kilocycles), as in the case of the blood samples. Two substantially ohmic impedances $r_1$ and $r_2$ are thus determined for each subject, which impedances may be termed extracellular and intracellular respectively, and experience demonstrates that the values thus found are of considerable interest for detection of abnormal conditions.

In the embodiment of FIG. 3 the apparatus for the carrying into practice of the above method comprises an oscillator 4 operatable at two frequencies under control of a two-way switch 5. The lower frequency is conveniently about 1000 cycles while the higher frequency may be of about 500 kilocycles to take into account the fact that for some tissues the frequency at which the curve A becomes again horizontal may be situated somewhat above 100 kilocycles. Reference numeral 6 designates an electric power source of accurately controlled voltage. The output of oscillator 4 is applied through line and two-way switch 7 to either one of two resistances 8 and 9 adapted to be used selectively at the lower frequency and at the higher frequency. In a practical embodiment the values of these resistances are 150 and 650KΩ. Resistances 8 and 9 are connected to the first measuring electrode 10, the second one 11 being grounded. The voltage difference across electrodes 10 and 11 is measured by an electronic voltmeter 12 which is energized by source 6. The operating voltage of oscillator 4 at both frequencies being accurately adjusted, voltmeter 12 may directly indicate the impedances $Z_1$ and $Z_2$. The individual impedances $r_1$ and $r_2$ are thereafter calculated from relations 1 and 2 above.

FIG. 4 illustrates a more sophisticated apparatus which indicates directly $r_1$ and $r_2$ under digital form.

An R-C oscillator 13 is adapted to operate at two frequencies, as for instance 1000 cycles and 500 kilocycles, under control of a double two-way switch 14 actuated by a coil 15, switch 14 connecting with oscillator 13 either resistance 16 which corresponds to the lower frequency when coil 15 is unenergized, or resistance 17 which corresponds to the higher frequency when coil 15 is energized. The output from oscillator 13 is applied to a phase shifter 18 which yields two equal voltages with a phase difference of 180° with respect to each other, these voltages being applied to electrodes 10 and 11 through amplifiers 19, 20 and resistances 21, 22. The voltage difference between the outputs of amplifiers 19 and 20 is rectified by a rectifier bridge 23 and it is applied to a calibrator 24 which emits a controlling signal, the latter being applied to oscillator 13 to maintain the said voltage difference at a predetermined constant value, as for instance 15.1 volts, in which case, the values of resistances 21 and 22 may conveniently be 75KΩ for both.

The voltage across electrodes 10 and 11 is applied to a differential amplifier and rectifier 25 and the D.C. output of the latter (which represents the said voltage under amplified form) is in turn applied to the first inlet of a comparator 26 for the purpose to be described.

A counting oscillator 27 operating at a frequency of about 1 megacycle is connected with the inlet of an electronic switch 28. This switch 28 is normally open, but it may be triggered to the closed position by a pulse applied through a triggering line 29 and it remains closed until the next pulse received from line 29. Line 29 is connected by a line 30 with the output of comparator 26. The outlet of switch 28 actuates a digital electronic counter 31 which counts the pulses received from oscillator 27 through switch 28. Counter 31 may for instance comprise four orders corresponding to four digits. The triggering line 29 has a branch 29a which is connected with the triggering inlet of a one-shot saw-tooth generator 32. The saw-tooth from the latter controls a variable resistor 33 in such a manner that the resistance of the latter increases from zero to a maximum and then returns to zero at the end of the saw-tooth. Resistor 33 is interposed between an accurately calibrated constant current generator 34 and the ground. Its outlet is connected by a line 35 with the second inlet of comparator 26.

The apparatus further includes a digital rheostat 36 having four knobs corresponding to units, tens, hundreds and thousands of ohms with an appropriate scale factor, as explained below, this rheostat being insertable in parallel with resistor 33 by means of a switch 37 actuated by a coil 38.

Coils 15 and 38 are energizable by means of an appropriate control switch, not illustrated.

The operation is as follows:

The apparatus being at rest with coils 15 and 38 unenergized, electrodes 10 and 11 are disposed on the subject in the conventional manner (i.e. under the skin of both hands) and the apparatus is started. Switch 14 is at the position illustrated and oscillator 13 thus operates at 1000 cycles. Switch 28 is at its normal open position and therefore counter 31 is not actuated by oscillator 27. Saw-tooth generator 32 is at rest and consequently the variable resistor 33 is at zero value, the voltage on line 35 being also zero. Switch 37 is open and rheostat 36 is therefore ineffective.

The output from oscillator 13 is amplified by amplifiers 19, 20 and the voltage difference between the outputs of the latter is maintained at 15.1 volts by calibrator 24. The current flows through the subject and owing to the presence of resistances 21, 22 and to the impedance $Z_1$ of the subject a voltage difference of less than 15.1 volts appears between electrodes 10 and 11. This difference is amplified and applied under rectified form to the first inlet of comparator 26. Since the voltage on the second inlet thereof (line 35) is zero, no signal appears on line 30.

The operator then sends a short pulse on triggering line 29, as for instance by means of a conventional one-shot pulse emitter. This pulse triggers switch 28 and saw-tooth generator 32. Oscillator 27 then actuates digital counter 31 at the rate of one unit per micro-second, while the saw-tooth from generator 32 increases progressively the resistance of resistor 33 and consequently the voltage on line 35.

When the voltage on line 35 is equal to the voltage from differential amplifier and rectifier 25, comparator 26 emits a signal which triggers switch 28 to the open position, thus stopping counter 31 at a given digital value. Since the values indicated by counter 31 and the voltage on line 35 have increased linearly from zero, starting from the triggering pulse on line 29, the apparatus may be set in such a manner that the digital value in counter 31 is equal to the impedance at 1000 cycles across electrodes 10, 11 (impedance $Z_1$). Since $Z_1 = r_1$ (see relation 1), the first individual impedance appears directly on counter 31.

The adjustment of the apparatus for this purpose may be effected by acting on a number of factors, namely gain of differential amplifier 25, arrangement of comparator 26 (which may emit its signal for any predetermined relation, other than equality, between its inlet voltages), frequency of oscillator 27, slope of the saw-tooth from generator 32, characteristics of variable resistor 33 and value of the intensity supplied by constant current generator 34.

It is to be noted that with such an arrangement the resistance of resistor 33 at the time of the signal from comparator 26, is the analog of impedance $Z_1$, i.e. it is equal to same multiplied by a constant factor $k$.

Rheostat 36 is then set to the value thus found for $Z_1$ (impedance at 1000 cycles) and the second measuring operation is effected with coils 15 and 38 energized. The apparatus operates as above described except for the following differences: In the first place the frequency of oscillator 13 is now 500 kilocycles, and secondly rheostat 36 (the resistance of which is now equal to $k'Z_1$) is in parallel with variable resistor 33.

When comparator 26 stops the advance of digital counter 31, the combined resistance of resistor 33 plus rheostat 36 in parallel is the analog of the impedance at 500 kilocycles between electrodes 10, 11 (impedance $Z_2$), as in the first case. Therefore $$\frac{1}{R_{33}} + \frac{1}{R_{36}} = \frac{1}{kZ_2}$$

($k$ being the same constant factor as in the first case). And since $R_{36} = k'Z_1$ ($k'$ being the scale factor between the digital indications of the rheostat and the effective resistance thereof)

$$\frac{1}{R_{33}} + \frac{1}{k'Z_1} = \frac{1}{kZ_2}$$

Or, if $k'$ is made equal to $k$ $$\frac{1}{R_{33}} = \frac{1}{k}\left(\frac{1}{Z_2} - \frac{1}{Z_1}\right)$$

$$R_{33} = k\frac{Z_1 Z_2}{Z_1 - Z_2} = kr_2 \text{ (see relation 2)}$$

Therefore counter 31 directly indicates the impedance $r_2$.

FIG. 5 is illustrative of a possible embodiment of differential amplifier and rectifier 25. Lines 39 and 40 from electrodes 10, 11 (see FIG. 4) are connected to the inlets of amplifiers 41, 42, the outputs of which are connected with inversely disposed diodes 43, 44 through capacitors 45, 46, the lower or outlet armature of the latter being connected to ground through equal resistances 47, 48. The outputs of diodes 43, 44 are connected to each other by a resistance 49 the midpoint 50 of which forms the output of the device. Capacitors 51, 52 eliminate the A.C. components. It is clear that any difference in the A.C. voltages of lines 39, 40 (with respect to ground) results in a D.C. voltage at point 50. The D.C. voltage of point 50 is therefore representative of the voltage across electrodes 10, 11.

Figure 6:
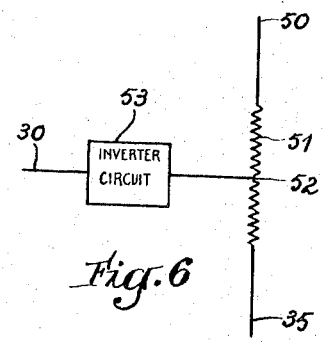

FIG. 6 shows a comparator formed of a resistance 51 inserted between point 50 and line 35 with its mid-point 52 (or any other point if equality is not required) connected to line 30 through an inverter circuit 53. If the voltages applied at the ends or inlets of resistance 51 are of opposed sign (which condition is easily fulfilled) no outlet voltage will appear at point 52 when these inlet voltages are of equal value and therefore inverter circuit 53 will emit a signal of equality.

Figure 7:
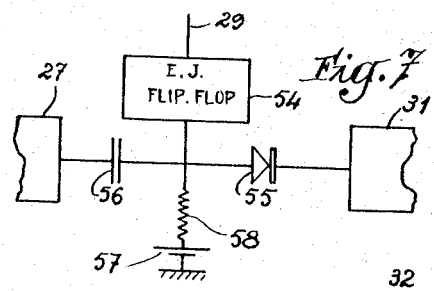

FIG. 7 illustrates a possible construction of switch 28. Triggering line 29 actuates an Eccles-Jordan flip-flop 54 the output of which is connected with the inlet side of a diode 55 inserted between a capacitor 56 connected to the outlet of oscillator 27 and counter 31. This side of diode 55 is polarized negatively by a cell or like electric source 57 through a resistance 58. When the output of flip-flop 54 is zero, the negative polarization of diode 55 is such that no pulse is transmitted to counter 31. When the output of flip-flop 54 is +1, this negative polarization is suppressed and counter 31 is actuated.

Figure 8:
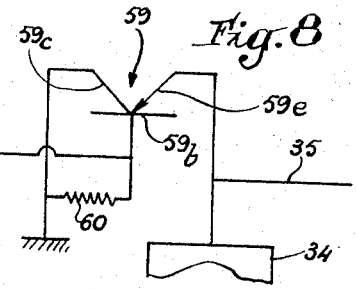

FIG. 8 shows a practical embodiment of variable resistor 33 in the form of a transistor 59 having its emitter 59E connected to the outlet of constant current generator 34 and to line 35, its collector 59c connected to ground, and its base 59b connected to collector 59c through a polarizing resistance 60. The output of saw-tooth generator 32 is applied to base 59b through a capacitor 61. In the absence of the saw-tooth the emitter-collector resistance is practically zero, but it increases regularly as the base is driven more positive by the saw-tooth from generator 32. If the resistance characteristic of transistor 59 is not quite rectilinear, this may be compensated by deliberately imparting to the saw-tooth a complementary deformation, as this is conventional in the art. Also if the resistance at rest is noticeable, this may be accounted for by delaying the operation of the saw-tooth generator 32 (by means of a conventional delay circuit) until the digital value in counter 31 is equal to this residual resistance.

Figure 9:
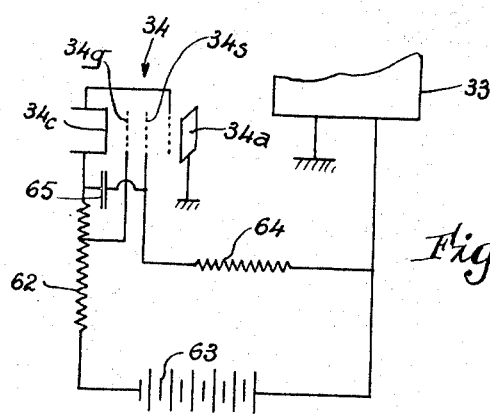

FIG. 9 illustrates a conventional constant current generator in the form of a pentode the anode $34a$ of which is grounded. A relatively high resistance 62 is disposed between the negative terminal of the power source 63 and the cathode $34c$. The controlling grid $34g$ is connected to an appropriate point of resistance 62 while the screen $34s$ is connected to the positive terminal through a resistance 64, a capacitor 65 being inserted between screen 34s and cathode 34c. The positive terminal of source 63 is connected to the inlet of the variable resistor 33. It is well known that such a pentode behaves as a power generator of quite high internal resistance and that its anode current remains substantially constant irrespective of the load (which is in this case the variable resistance of resistor 33).

Of course FIGS. 5–9 are only illustrative of possible embodiments of the devices used in connection with the apparatus of FIG. 4.

I claim:

1. A method for simultaneously and associatively determining the individual impedances $r_1$, and $r_2$ of the extracellular contents and of the intracellular contents of a living organism which consists in measuring the total impedance $Z_1$ of the said organism between two selected points thereof at a first frequency of about 1000 cycles, for which the influence of electrolytic phenomena is avoided while the capacitive current passing through the membranes of the cells is of negligible value with respect to the current which passes through the extracellular contents, in such manner that $Z_1$ is substantially equal to the value of the individual impedance $r_1$ of the extracellular contents; in measuring the total impedance $Z_2$ of the said organism between the said points at a second frequency of about 100 to 500 kilocycles to reduce the capacitive impedance of the membranes of the cells to a negligible value with respect to the impedance of the intracellular contents in such manner that $Z_2$ is substantially the resultant of the individual impedances $r_1$ of the extracellular contents and $r_2$ of the intracellular contents when connected in parallel; and in calculating $r_2$ from the formula $$\frac{1}{Z_2}=\frac{1}{r_1}+\frac{1}{r_2}$$

2. An apparatus for simultaneously and associatively determining the individual impedances of the extracellular contents and of the intracellular contacts of a living organism comprising two electrodes to be disposed at selected points of said organism; oscillating means capable of selectively operating at a first frequency of about 1000 cycles and at a second frequency of about 100 to 500 kilocycles, said oscillating means being connected with said electrodes; a resistance inserted between said oscillating means and one at least of said electrodes; and means to measure the voltage difference between said first and second electrodes at each of said frequencies.

3. In an apparatus as claimed in claim 2, phase shifting means disposed between said oscillating means and said electrodes to apply to the latter voltages having a phase difference of 180°.

4. In an apparatus as claimed in claim 2, a digital counter to directly indicate the impedance measured, and actuating means to actuate said digital counter under control of said voltage difference measuring means.

5. An apparatus for simultaneously and associatively determining the individual impedances of the extracellular contents and of the intracellular contents of a living organism comprising two electrodes to be disposed at selected points of said organism; oscillating means capable of selectively operating at a first frequency of about 1000 cycles and at a second frequency of about 100 to 500 kilocycles; a phase shifter having an inlet which receives the output from said oscillating means and two outlets with a mutual phase difference of 180°; a resistance inserted between each outlet of said phase shifter and one of said electrodes; a comparator to compare the voltage across said electrodes with a reference voltage, said comparator having a first and a second inlet and an outlet, and said comparator emitting a signal on its outlet when the voltage applied to its second inlet bears a predetermined relation to the voltage applied to its first inlet; differential means to generate a D.C. voltage proportional to the A.C. voltage across said electrodes, said D.C. voltage being applied to the first inlet of said comparator; a triggerable variable voltage source to apply to said second inlet of said comparator a reference voltage which varies as a linear function of time; a triggerable digital counting device to indicate the impedance between said electrodes, the digital indications of said counting device varying regularly by successive increments as a linear function of time until it is stopped by said signal from the outlet of said comparator; and means to simultaneously trigger said variable voltage source and said counting device in such manner that when the voltage of said source bears a predetermined relation to the voltage across said electrodes, said comparator stops said counting device.

6. In an apparatus as claimed in claim 5, said triggerable variable voltage source comprising a variable resistor through which a constant current passes to provide a correspondingly variable voltage across said variable resistor; a constant current source to supply electric current to said variable resistor; and triggerable means to cause the resistance of said variable resistor to regularly vary as a linear function of time.

7. In an apparatus as claimed in claim 5, said triggerable variable voltage source comprising a variable resistor through which a constant current passes to provide a correspondingly variable voltage across said variable resistor; a constant current source to supply electric current to said variable resistor; triggerable means to cause the resistance of said variable resistor to vary as a linear function of time; and a digital rheostat connectable in parallel with said variable resistor to cause said counting device to directly indicate the value of an individual impedance $r_2$ which, when in parallel with an individual impedance $r_1$ equal to the value at which said digital rheostat has been set, will produce a resulting impedance equal to the impedance across said electrodes.

References Cited by the Examiner

UNITED STATES PATENTS

| | | | |
|---|---|---|---|
| 2,298,506 | 9/1942 | Parker | 128—2.1 |
| 2,535,249 | 12/1950 | Wilhelm et al. | 128—2.1 |
| 3,064,641 | 11/1962 | Manenti | 128—2.1 |
| 3,085,566 | 4/1963 | Tolles | 128—2.1 |
| 3,207,151 | 9/1965 | Takagi | 128—2.1 |

RICHARD A. GAUDET, *Primary Examiner.*

SIMON BRODER, *Examiner.*